United States Patent
Sankaran et al.

(10) Patent No.: US 9,931,954 B2
(45) Date of Patent: Apr. 3, 2018

(54) VERTICAL WIRELESS POWER TRANSFER SYSTEM FOR CHARGING ELECTRIC VEHICLES

(71) Applicant: FORD GLOBAL TECHNOLOGIES, LLC, Dearborn, MI (US)

(72) Inventors: Venkateswa Anand Sankaran, Farmington Hills, MI (US); John Paul Gibeau, Canton, MI (US); James A. Lathrop, Saline, MI (US); Christopher W. Bell, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 101 days.

(21) Appl. No.: 14/172,501

(22) Filed: Feb. 4, 2014

(65) Prior Publication Data

US 2015/0217655 A1 Aug. 6, 2015

(51) Int. Cl.
 *B60L 11/18* (2006.01)
 *H02J 50/90* (2016.01)

(52) U.S. Cl.
 CPC ......... *B60L 11/1831* (2013.01); *B60L 11/182* (2013.01); *B60L 11/1829* (2013.01); *B60L 11/1833* (2013.01); *H02J 50/90* (2016.02); *B60L 2250/16* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01); *Y02T 90/168* (2013.01); *Y04S 30/12* (2013.01); *Y10S 903/903* (2013.01)

(58) Field of Classification Search
 CPC    B60L 11/1831; B60L 11/1833; B60L 11/182; Y10S 903/903
 USPC .......................................................... 701/22
 See application file for complete search history.

(56) References Cited

U.S. PATENT DOCUMENTS

| | | | | |
|---|---|---|---|---|
| 5,498,948 A | * | 3/1996 | Bruni et al. | 320/108 |
| 5,654,621 A | * | 8/1997 | Seelig | 320/108 |
| 5,821,731 A | * | 10/1998 | Kuki | B60L 11/1805 320/108 |
| 6,784,791 B2 | * | 8/2004 | Rao | B60Q 1/525 340/435 |
| 7,138,938 B1 | * | 11/2006 | Prakah-Asante | B60R 21/0134 342/175 |
| 7,671,567 B2 | * | 3/2010 | Eberhard | H02J 7/045 320/150 |
| 8,169,340 B2 | * | 5/2012 | Oyobe et al. | 340/932.2 |
| 8,384,344 B1 | | 2/2013 | Rogers | |
| 8,655,530 B2 | * | 2/2014 | Ichikawa | 701/22 |
| 8,700,258 B2 | * | 4/2014 | Tate, Jr. | B62D 15/028 340/435 |

(Continued)

FOREIGN PATENT DOCUMENTS

DE    102010063665 A1    6/2012

*Primary Examiner* — Angela Y Ortiz
*Assistant Examiner* — Michael A Berns
(74) *Attorney, Agent, or Firm* — David Kelley; Brooks Kushman, P.C.

(57) ABSTRACT

A park assist system may, in response to receiving a signal indicating that a remote inductive charge source is within a vicinity of a vehicle, transition from a park assist mode to a wireless charging mode. During the wireless charging mode, the park assist system generates instructions to assist a driver in positioning the vehicle relative to the inductive charge source.

12 Claims, 6 Drawing Sheets

(56) References Cited

U.S. PATENT DOCUMENTS

| | | | |
|---|---|---|---|
| 2010/0161217 A1* | 6/2010 | Yamamoto | 701/207 |
| 2010/0235006 A1* | 9/2010 | Brown | B60L 11/182 700/286 |
| 2011/0221387 A1* | 9/2011 | Steigerwald | B60L 11/182 320/108 |
| 2012/0089286 A1* | 4/2012 | Nakata | B60L 11/005 701/22 |
| 2012/0203410 A1* | 8/2012 | Wechlin et al. | 701/22 |
| 2013/0037339 A1 | 2/2013 | Hickox | |
| 2013/0037365 A1 | 2/2013 | Ichikawa | |
| 2014/0015328 A1* | 1/2014 | Beaver et al. | 307/104 |
| 2015/0002090 A1* | 1/2015 | Nakaya | H02J 5/005 320/108 |
| 2015/0042168 A1* | 2/2015 | Widmer | 307/104 |
| 2015/0094887 A1* | 4/2015 | Kawashima | 701/22 |

* cited by examiner

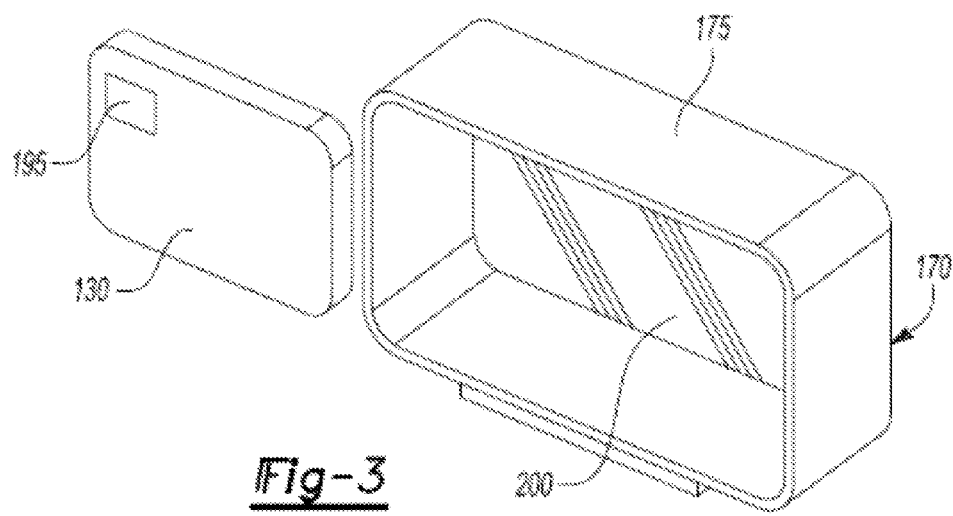
Fig-3
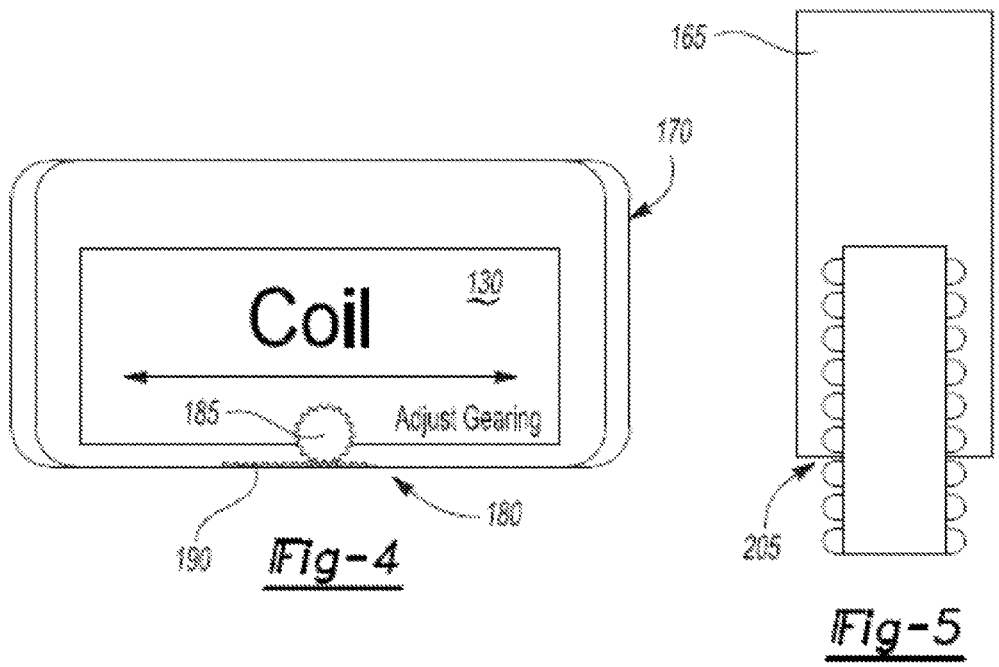 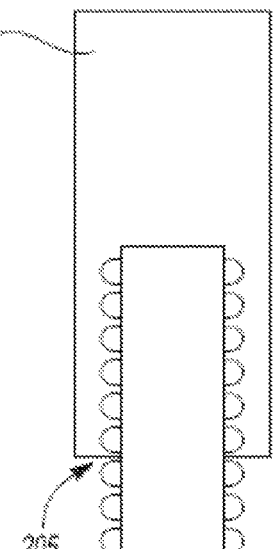
Fig-4
Fig-5

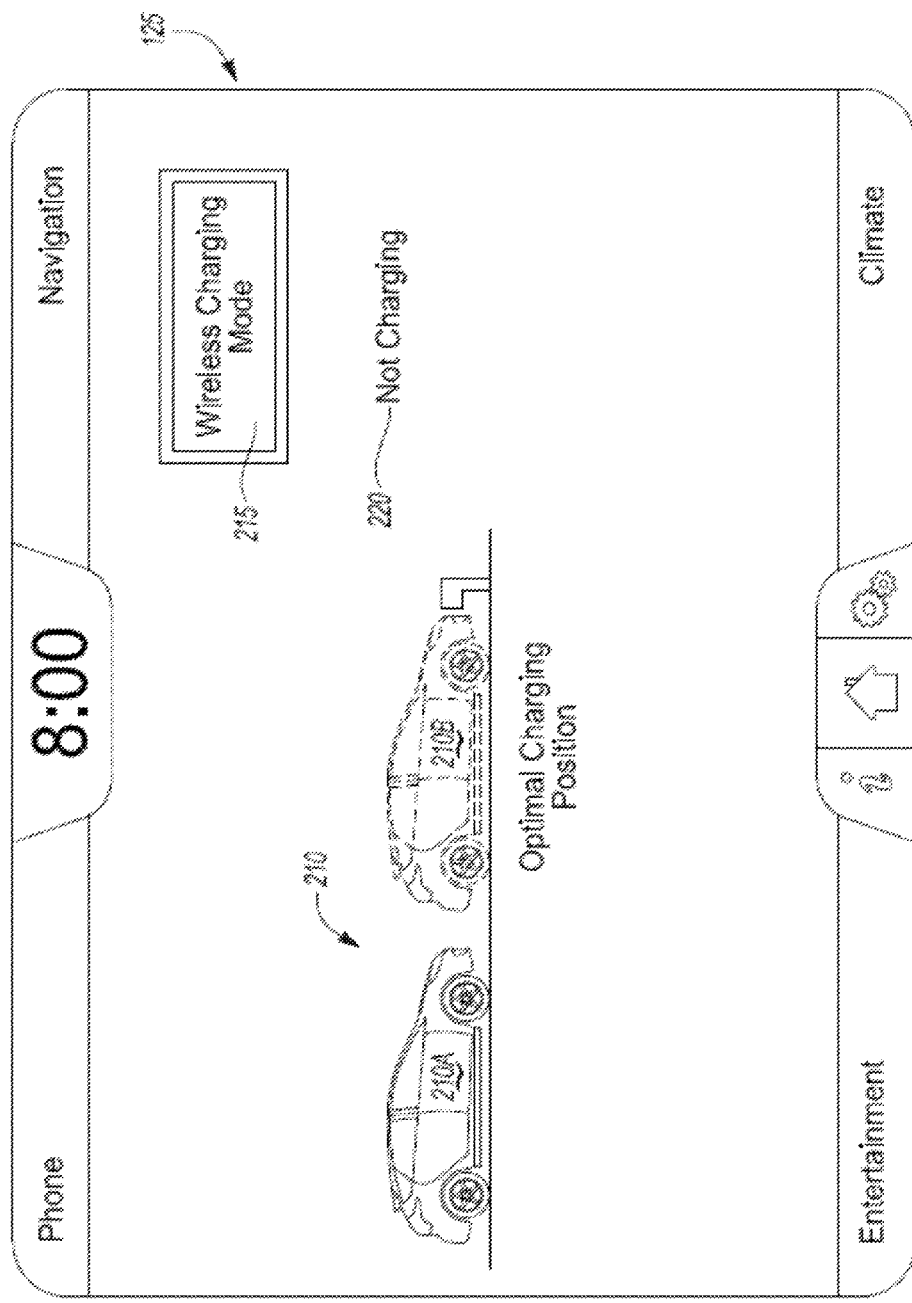

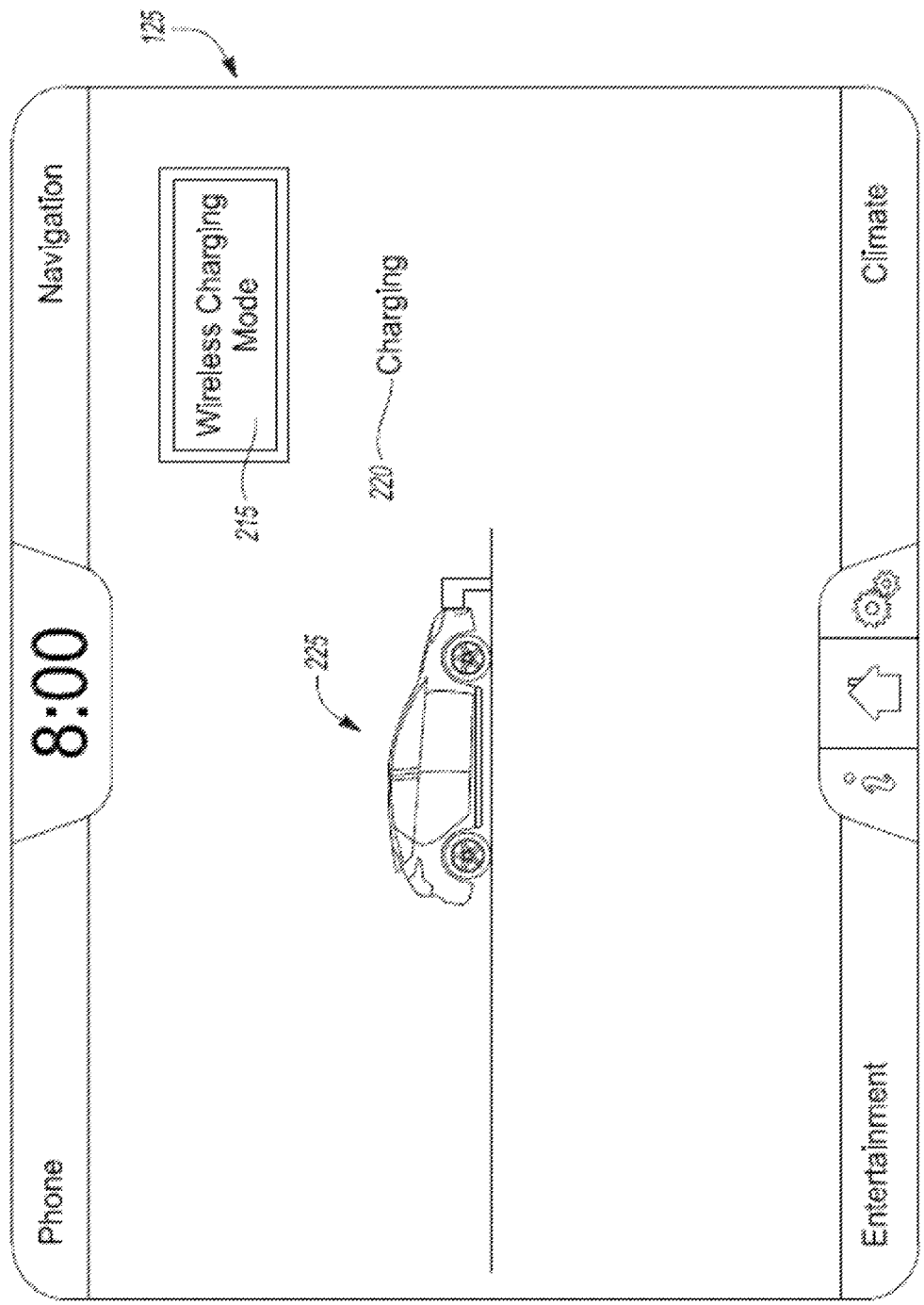

VERTICAL WIRELESS POWER TRANSFER SYSTEM FOR CHARGING ELECTRIC VEHICLES

TECHNICAL FIELD

Disclosed herein are automotive wireless power transfer systems.

BACKGROUND

Battery operated vehicles and hybrid electric vehicles may connect to external power supplies for battery charging. Vehicles may also use inductive charging techniques for battery charging. Such inductive charging techniques may require a charging coil within the vehicle to be aligned with an external coil. In order for power to be efficiently transferred between the coils, the coils should be in alignment with one another.

SUMMARY

A vehicle includes a secondary charge coil, and a park assist system including a transceiver and at least one controller. The at least one controller, during a parking mode, outputs instructions to assist a driver in avoiding contact with objects within a vicinity of the vehicle, and causes the secondary charge coil to periodically generate a field to excite a remote primary charge coil. During a charging mode initiated based on a response to the field, the at least one controller outputs instructions to assist the driver in positioning the secondary charge coil relative to the primary charge coil.

A park assist system includes at least one controller that, in response to receiving a trigger signal, transitions from a parking mode in which instructions are output to assist a driver in avoiding contact with objects in a vicinity of a vehicle to a wireless charging mode in which instructions are output to assist the driver in positioning an on-board secondary charge coil relative to an off-board primary charge coil.

A method for advising a driver of a vehicle includes, during a parking mode, outputting instructions to assist the driver in avoiding contact with objects within a vicinity of the vehicle and causing charge coil excitation signals to be broadcast from the vehicle, transitioning from the parking mode to a wireless charging mode in response to receiving a reply to the charge coil excitation signals, and during the wireless charging mode, outputting instructions to assist the driver in positioning the vehicle relative to a charge source separate from the vehicle.

BRIEF DESCRIPTION OF THE DRAWINGS

FIG. 3 is an exploded perspective view of an exemplary housing portion of the external power source;

FIG. 4 is a transparent front view of the exemplary housing portion;

FIG. 5 is a transparent front view of an exemplary support portion of the external power source;

FIGS. 6A-6C are exemplary interfaces for the wireless power transfer system;

DETAILED DESCRIPTION

Figure 1:
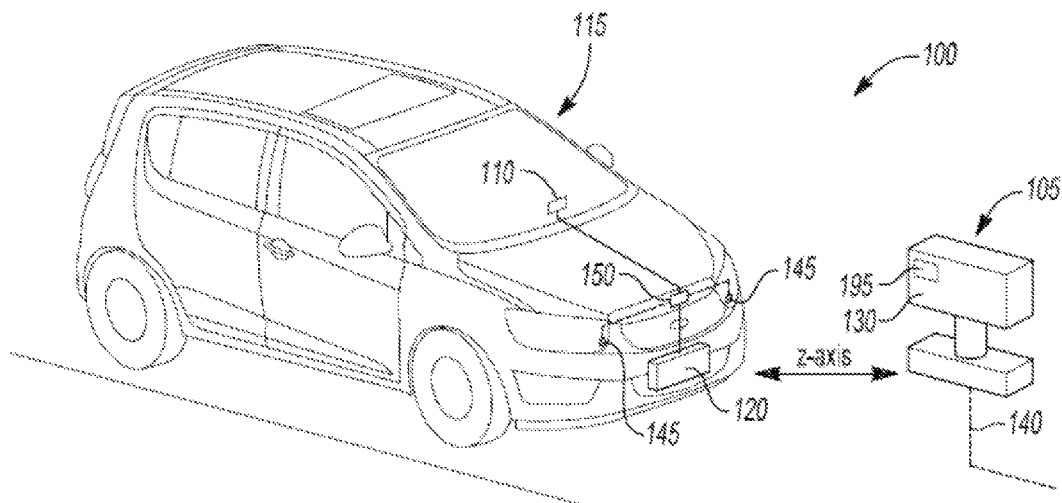
FIG. 1 shows an exemplary wireless power transfer system.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Inductive or wireless charging may use an electromagnetic field created between two coils to transfer energy from one coil to the other. A transmitting coil and a receiving coil may be inductively coupled such that as current flows through the transmitting coil, energy is emitted and transferred to the secondary coil. The receiving coil may be coupled to a battery within a vehicle and the energy received therein may be used to power or charge the battery.

In order for the receiving coil to sufficiently charge or power a device, the receiving coil may be in close proximity with the transmitting coil. The proximity of the coils to one another may affect the strength of the electromagnetic field. That is, the closer the coils, the stronger the field. In the event that resonance is created between the two coils, the coils may be separated by a greater distance while still remaining inductively coupled. In vehicle charging systems, the transmitting coil may be included in a charging pad and the receiving coil may be included in the vehicle. The secondary coil may be located near or on the bottom of the vehicle. The vehicle may then drive over the charging pad so that the primary and secondary coils may align. Once aligned, the primary coil may transmit energy to the secondary coil. The energy may be converted and used to charge a vehicle battery.

However, the charging pads may be relatively large. Incorporating a receiving coil into a vehicle to match and align with the transmitting coil in the charging pad may be difficult, especially if the underside of the vehicle is limited in size. Often times, suitable mounting locations beneath modern vehicles, including hybrid vehicles, may be limited by the engine, exhaust system, battery pack, and floor pan. Due to the space constraints on the underside of a vehicle, the size of the receiving coil may be reduced. As a result of a reduced coil size, the offset tolerance, or misalignment between the receiving and transmitting coils, may be greatly diminished resulting in a requirement that the transmitting and receiving coils be precisely aligned. Locating systems may be used to aid in the alignment of the coils, but are often expensive to implement. Described herein is a locating system that uses existing sensors, e.g., ultrasonic sensors, etc., within the vehicle to align the receiving coil within the vehicle with a vertically mounted external charging source.

Referring to FIG. 1, a wireless power transfer system 100 may include an external power source 105 and a vehicle 115. The vehicle 115 may include a rechargeable battery (not shown) and a receiving coil (or secondary coil 120). The vehicle 115 may also include a display device 110 having an interface 125, as described with respect to FIG. 6 below. The battery within the vehicle 115 may be configured to be charged via inductive charging. As explained above, the receiving coil 120 may, upon receiving electronic energy from an exterior source, transmit electrical current to the battery. The receiving coil 120 may receive the energy from a transmitting coil 130 within the external power source 105. The pedestal 105 may be mounted to an existing wall and may use an existing wall power conduit. The pedestal 105 may also be a free-standing pedestal using an underground power supply 140 for supplying power to the transmitting coil 130. The power supply 140 may be an alternating current (AC) power source, or may facilitate a connection to a power grid (not shown). The power supply 140 may also connect, either directly or indirectly, to a renewable resource, such as a solar panel or wind turbine.

The receiving coil 120 may be located at or on a vehicle's front license plate holder. In states in which front license plates are required, the receiving coil 120 may be located beside, atop or below the license plate. Similarly, in circumstances in which vehicles have rear license plates, any receiving coils 120 at the rear of the vehicle may be located beside, atop or below the rear license plate. The receiving coil 120 may be placed under a non-conductive bumper cover or license plate cover. The coil 120 may be covered so as to be hidden from view with no effect to the aesthetics of the vehicle 115. The transmitting coil 130 may be housed within the external power source 105 and may be configured to align with the receiving coil 120 (e.g., at bumper height), in the x, y and z-axis. In other configurations, the coils 120, 130 may be configured to align at the rear of the vehicle 115. By placing the receiving coil 120 at the front or rear of the vehicle 115, the design constraints traditionally imposed on under-vehicle configurations are removed (e.g., space, location, layout, etc.)

Further while the receiving coil 120 and the transmitting coil 130 are described as such herein, the receiving coil 120 may also be configured as a transmitting coil and the transmitting coil 130 may also be configured as a receiving coil.

The display device 110 may be configured to display the interface 125 such as a human machine interface (HMI) to the driver, or other user of the vehicle 115. The display device may be located in a vehicle's center console. It may also be located on the dashboard. The display may be a visual display device such as a liquid-crystal display (LCD) or other type of flat panel display, including but not limited to plasma displays, light emitting diode (LED) displays, etc. The display device 110 may also be a heads up display (HUD) configured to be displayed on the windshield of the vehicle 115. The interfaces 125 displayed via the display device 110 may be configured to present information to the driver about the vehicle 115. This may include climate information, navigation information, media information, etc. The interface 125 may also be configured to present information relating to the position of the vehicle 115, as well as the charging status.

As shown in FIG. 1, the vehicle 115 may include a pair of sensors 145 located at a front of the vehicle 115. The sensors 145 may also be on the rear of the vehicle 115. The sensors 145 may be spaced from each other and may be ultrasonic sensors. Ultrasonic sensors may transmit high frequency sound waves and receive response sound waves, or echoes. Each echo may be converted into energy. This energy may be used to estimate the distance that the vehicle 115 is from an object. These sensors 145 may be included in the vehicle 115 and may be used by several vehicle systems. In one example, the sensors 145 may be used by a park assist feature. Additionally or alternatively, the sensors 145 may be used by a pedestrian protection system. As described herein, the sensors 145 may be used by a wireless charging system to estimate the distance between the vehicle 115 and the external power source 105.

The vehicle 115 may also include a vehicle controller 150. The vehicle controller 150 may interface with the sensors 145, the receiving coil 120 and the display device 110. The vehicle controller 150 may be a function controller within the vehicle 115 configured to control various vehicle systems and features such as park assist, passive entry passive start, climate control, etc. The vehicle controller 150 may also be configured to display certain interfaces 125 via the display device 110. Upon receiving an echo, the ultrasonic sensors 145 may supply the converted energy corresponding to the echo to the controller 150. Based on the energy, the controller 150 may estimate the distance between the vehicle 115 and an upcoming object. This distance may be used by a park assist system within the vehicle 115 to ensure that when parallel parking, the vehicle 115 does not come into contact with another object, such as a pole, another vehicle, etc. The sensors 145 may also detect the external charging source 105. The controller 150 may provide instructions to the display device 110 to assist a driver in avoiding contact with the external objects.

As explained, this external power source 105 may be a vertical pedestal 105 and therefore be detectable by the sensors 145 at the front of the vehicle 115. Additionally or alternatively, sensors 145 may be arranged at the back of the vehicle 115. The controller 150 may use the echoes received by the sensors 145 to estimate the distance between the vehicle 115 and the pedestal 105. Upon estimating this distance, the controller 150 may instruct the display device 110 to provide a visual indication 210 of the distance, examples of which are shown in FIG. 6. This visual indication 210 may aid the driver in achieving an appropriate and optimal distance between the external charging source 105 and the vehicle 115. The most optimal distance may be a predefined distance maintained by the controller 150 in which the primary coil 130 may successfully and efficiently transfer energy to the secondary coil 120. In some circumstances, the closer the coils, the greater the power transfer. Thus, an optimal distance may be a distance of no more than 10 mm, for example. Exemplary interfaces 125 are described with respect to FIG. 6 below.

In addition to the interface 125, other indicators may be used to indicate the distance between a vehicle 115 and an external power source 105. For example, audio signals may be played via speakers within the vehicle 115. These audio instructions may include chimes that increase in frequency as the distance decreases. The volume, or tone, of the signals may increase or decrease according to the distance. Additionally or alternatively, one or both of the interior and external lights of the vehicle 115 may change according to the distance.

The vehicle controller 150 may be configured to switch modes upon detecting an external power source 105. For example, the controller 150 may be configured to receive an indication from the receiving coil 120 that the vehicle 115 is approaching the vertical pedestal 105. The receiving coil 120 may recognize the pedestal 105 by detecting a pre-existing coil-to-coil radio frequency communication system as a result of the receiving coil 120 coming within a proximity of the pedestal 105. Information processing technology (IPT) systems may facilitate the coil-to-coil radio frequency communication between the wireless charging system within the vehicle 115 and the external pedestal 105.

These radio-frequency communications may begin when the vehicle is approximately 10 feet away, or more.

The vehicle controller 150 may detect an external power source 105 by instructing certain activation or request signals to be transmitted periodically. The vehicle controller 150 may include a vehicle transceiver (not shown), and the coil controller 195 may include a coil transceiver (not shown). The transceivers may communicate with each other via a wireless signal at a predetermined frequency (e.g., between 3 kHz and 300 GHz.) The vehicle controller 150 may initiate communication with the coil controller 195. This may be in the form of a request signal. The request signal may include certain data such as a vehicle identification number. Once the coil controller 195 receives the request signal, it may authenticate the vehicle 115 and respond with a reply or authentication signal. Once the vehicle controller 150 receives confirmation from the external charging source 105, the controller 150 may enter the wireless charging mode. That is, the vehicle 115 may periodically transmit signals in an effort to detect external power sources 105. The request and reply signals may be transmitted over the coil-to-coil frequency communication system.

Figure 2:
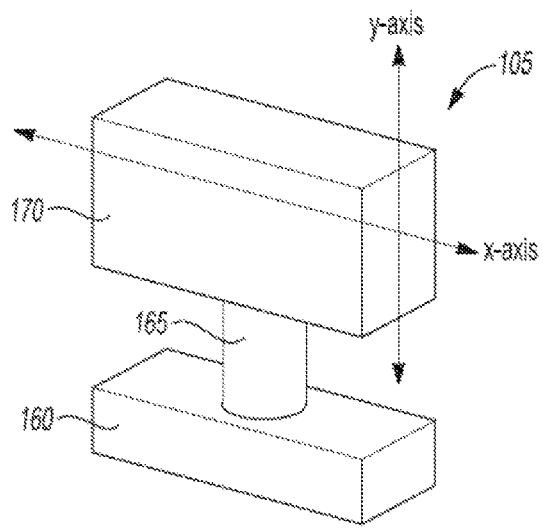
FIG. 2 is a perspective view of an exemplary external power source of the wireless transfer system.

FIG. 2 is a perspective view of an exemplary external power source 105. The power source (i.e., pedestal) 105 may include the transmitting coil (or primary coil) 130. The external power source 105 may include a base portion 160, a support portion 165 and a housing portion 170. The base portion 160 may be fixed to the ground and may be configured to receive the underground power supply 140 (shown in FIG. 1.) The housing portion 170 may be configured to house the transmitting coil 130. Although not shown, various portions of the pedestal 105 may be spring loaded and configured to regain its location should a vehicle 115 come into contact with the pedestal 105. For example, should the driver overshoot the proper position and run into the pedestal 105, the pedestal 105 may regain its original upright stature by springing back into place. This configuration would prevent damage to both the pedestal 105 and the vehicle 115 and prolong the life of the pedestal 105.

FIG. 3 is an exploded perspective view of the housing portion 170 of FIG. 2. The housing portion 170 may define a coil receptacle between a housing wall 175 and a shield 200. The shield 200 may be a shroud configured to prevent foreign objects from entering the housing portion 170. The shield 200 may made of a material configured to withstand outdoor elements. The shield 200 may also prevent or greatly reduce electric and magnetic field (EMF) and electromagnetic compatibility (EMC) emissions. In one example the shield 200 may be aluminum. The transmitting coil 130 may be received by the receptacle and be configured to be moveable therein.

FIG. 4 is a transparent front view of an exemplary housing portion 170. The transmitting coil 130 may be moveable in a horizontal direction within the housing portion 170 via a first, or horizontal adjustment mechanism 180. The coil adjustment mechanism 180 may include a rack and pinion mechanism, as shown in FIG. 4, to move the coil 130 from left to right and vice-versa. The transmitting coil 130 may include a pinion 185 having a plurality of teeth thereon. A bottom side of the housing wall 175 may have a rack 190 having a plurality of recesses configured to receive the teeth of the pinion 185. The adjustment mechanism 180 may be in communication with a coil controller 195. The coil controller 195 may be configured to instruct the attachment mechanism 180 to move the coil to a specified location along the horizontal, x-axis.

The horizontal adjustment mechanism 180, although shown as a rack 190 and pinion 185 assembly, may be include other mechanisms for moving the coil 130 horizontally within the housing portion 170. For example, a hydraulic cylinder may be used to adjust the coil within the housing portion 170. The cylinder may be movable in the x-axis. The coil 130 may be attached to the cylinder or wrapped around it. The cylinder may include a non-inductive cover in the instances where the coil 130 is wrapped around the cylinder. Other exemplary horizontal adjustment mechanisms 180 may include a power window lift mechanism having a motor to move the coil along the x-axis via an arm-like support.

By permitting the transmitting coil 130 to be horizontally adjustable, the transmitting coil 130 may be moved to an optimal horizontal position based on the position of the receiving coil 120. Once the vehicle 115 has approached the external power source 105 and reached an optimal position on the z-axis (i.e., is within an optimal distance from the external power source 105), the horizontal adjustment mechanism 180 may permit the transmitting coil 130 to achieve an optimal position on the x-axis.

Referring to FIG. 5, the support portion 165 may include a second, vertical adjustment mechanism 205. The vertical adjustment mechanism 205 may be configured to adjust the height of the housing portion 170 in order to place the transmitting coil 130 at an optimal vertical location relative to the receiving coil 120. The vertical adjustment mechanism 205 may include a ratchet mechanism, as shown in FIG. 5. The vertical adjustment mechanism 205 may also include other adjustment mechanism such as ones similar to the horizontal adjustment mechanism 180. The support portion 165 may include a telescoping mechanism permitting at least a portion of the support portion 165 to slide inside another portion so that the support portion 165 may expand and collapse to accommodate alternate heights. The vertical adjustment mechanism 205 may permit adjustment of the transmitting coil 130 in the y-axis. Thus, the coil 130 may be adjusted for varying bumper heights. In combination with the optimal distance and the optimal horizontal location, achieving an optimal vertical position may provide for an overall optimal coil position with respect to the receiving coil 120 in each of the three axis.

Figure 6B:
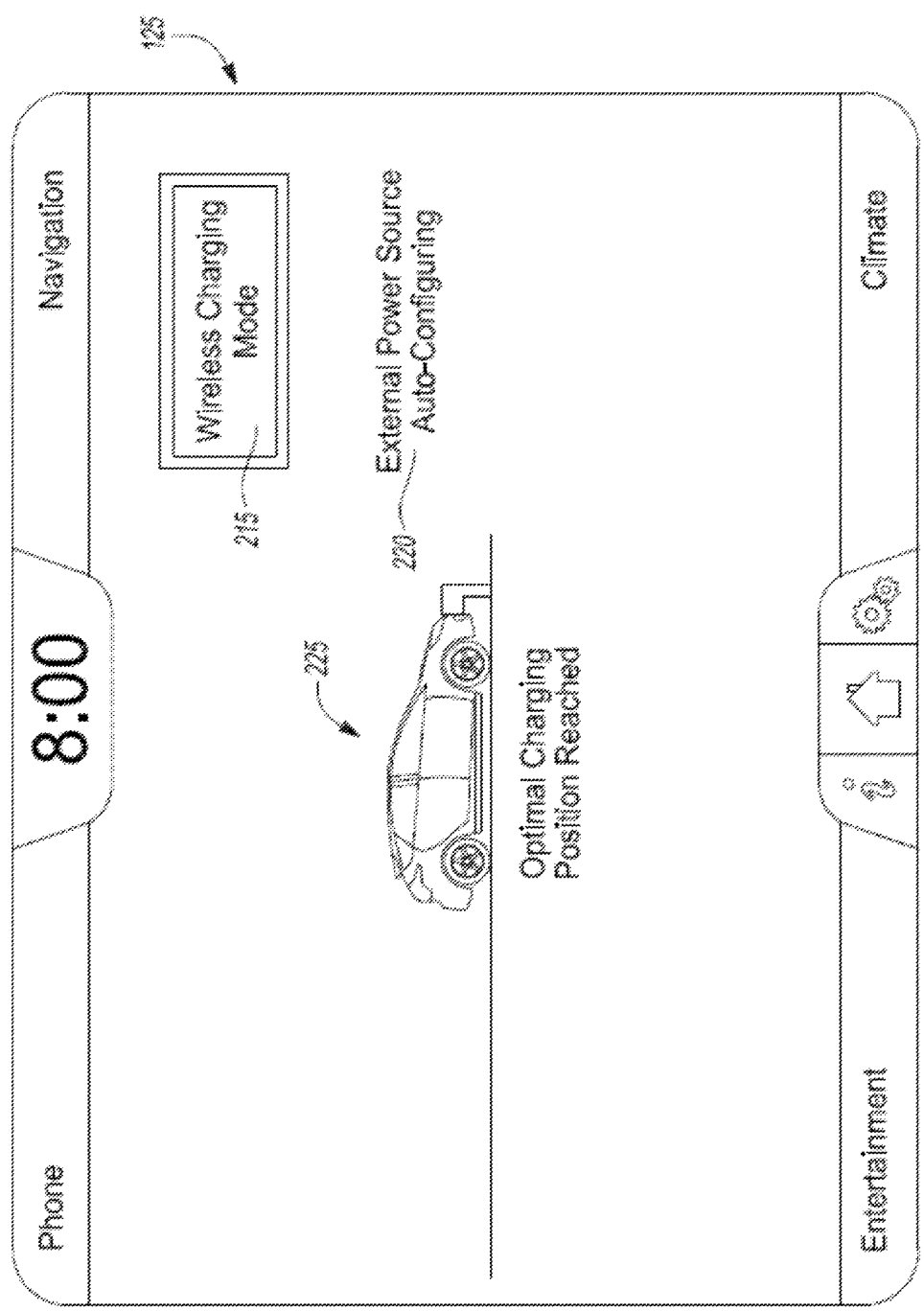

FIGS. 6A-6C are exemplary interfaces 125 for the wireless power transfer system 100. The interfaces 125 may be provided via the display device 110. The interface 125 may display information to the user during the wireless charging mode indicating the position of the vehicle 115 relative to the external power source 105. The interface 125 may be iteratively updated in real time or near real time so that as the vehicle 115 approaches the external power source 105, the interface is updated accordingly and appropriate alerts are generated. The interface 125 may guide the driver to the optimal charging position by instructing the driver to come within the predefined optimal distance of the external charging source 105. Thus, the driver receives feedback via the interface about the decreasing distance between the vehicle 115 and the external power source 105. By aligning the vehicle 115 along the z-axis and reaching an optimal distance, the external power source 105 may then automatically configure itself to the most optimal horizontal and vertical positions.

FIG. 6A is an exemplary interface 125 having a visual indication 210 of the current vehicle position relative to the optimal position. The visual indication 210 may be an alert and may include the current vehicle position 210A, and the optimal position 210B, as shown by vehicle icons. The interface 125 may also display an external power source icon. A current mode indicator 215 may also be included in the interface 125 to indicate the current mode of the vehicle. In the Examples of FIG. 6, the mode may be a "Wireless Charging Mode." A charging status indicator 220 may also be included. As the vehicle 115 approaches the external power source 105, the charge indicator may read "Not Charging."

FIG. 6B is an exemplary interface 125 having an optimal distance indicator 225. This indicator 225 may be a textual representation that the vehicle 115 has reached the optimal distance, or it may be a visual indication. In the example of FIG. 6B, the vehicle icon shows that the vehicle 115 is now at the optimal distance, in addition to the textual representation. Once the vehicle is within an optimal distance, the charge indicator 220 may indicate that the external power source 105 is auto-configuring. This informs the driver that the external power source 105 is now making adjustments for better alignment with the vehicle 115.

FIG. 6C is an exemplary interface 125 having a charge indicator 220 informing the driver that the vehicle 115 is currently "Charging." Although not shown, the charge indicator 220 may also indicate that the vehicle is "Fully Charged." It may also show an icon indicating the amount of current charge.

Although FIGS. 6A-6C depict a vehicle icon spaced from an external power source icon, other visual representations may be used to provide guidance to the driver. In one example, as a vehicle 115 approaches the external power source 105, a red, yellow, green, visual representation may inform the driver as to the proximity of the vehicle to the external power source 105. For example, to indicate that the vehicle 115 should proceed forward to approach the source 105, a green light may be displayed. As the vehicle 105 nears the source 105, a yellow light may be displayed indicating that the vehicle is getting closer to the optimal distance. Once the vehicle is within the optimal distance, a red light may be displayed indicating that the vehicle should stop at its current location.

Figure 7:
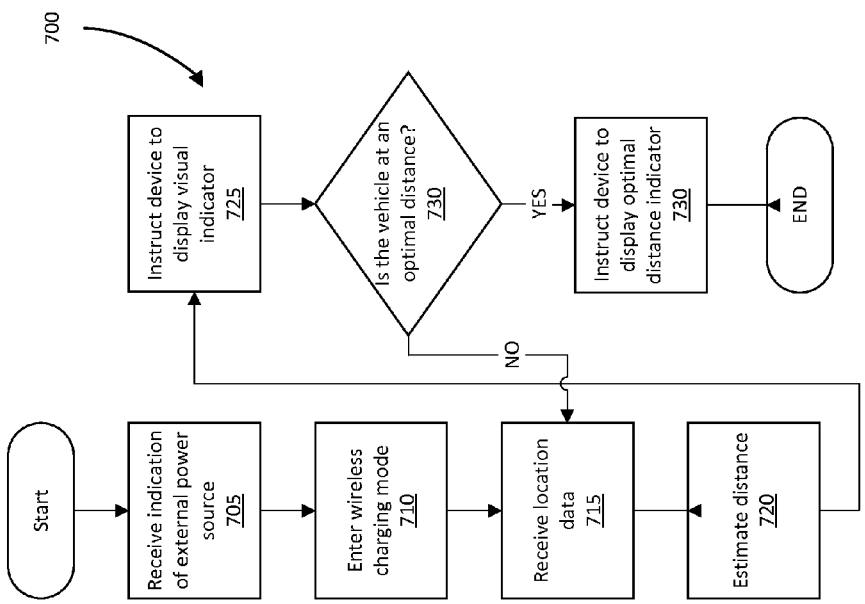
FIG. 7 is an exemplary flow chart for the wireless power transfer system.

FIG. 7 is an exemplary flow chart for the system 100. FIG. 7 is an exemplary process 700 for providing feedback via the vehicle interface 125 with respect to the distance between the vehicle 115 and the external power source 105.

In block 705, the vehicle controller 150 may receive an indication that the vehicle 115 is approaching an external power source 105. As explained above, this indication may be transmitted to the vehicle controller 150 by the coil controller 195. The coil controller 195 may recognize an external power source 105 by detecting a pre-existing coil-to-coil radio frequency communication system. As a vehicle 115 approaches the external power source 105, the controller 150 may transmit activation signals periodically. When the vehicle approaches the external power source 105, the activation signals may be received by the transceiver at the controller 195, thus awakening the external power source 105. The coil controller 195 may then transmit an authentication signal back to the vehicle controller 150.

In block 710, the vehicle controller 150, in response to receiving the indication that the vehicle 115 is approaching the external power source 105, may enter a wireless charging mode. The wireless charging mode may therefore be initiated upon detection of the external power source 105. By entering the wireless charging mode, the controller 150 may leave the park assist mode. That is, instead of assisting the driver in keeping a distance from an object, the controller 150 is now actively trying to close the distance from the external power source 105.

In block 715, once the vehicle controller 150 has entered the wireless charging mode, the vehicle controller 150 may receive location data from the sensors 145. This location data may be an energy measurement corresponding to the distance between the vehicle 115 and the external power source 105. The sensors 145 may receive this data by transmitting a sound wave and receiving an echo based on this sound wave. The sensors 145 may then convert the sound wave into energy. Other sensing technology, however, may also be used.

In block 720, the vehicle controller 150 may use the received location data to determine an estimated distance between the vehicle 115 and the external power source 105.

In block 725, the vehicle controller 150 may instruct the display device 110 to display a visual indicator of the vehicle position relative to the external power source 105. Exemplary visual indicators are shown in FIGS. 6A-6B.

In block 730, the vehicle controller 150 may determine whether the vehicle 115 is at an optimal distance from the external power source 105. The optimal position may be a position wherein the vehicle 115 is within a certain distance of the external power source 105. For example, an optimal position may be any position in which the distance is under 10 cm. The gap between the two coils may be between 6-10 cm, but may also be smaller than 6 cm. The smaller the gap, the more the offset capability is reduced. The controller 150 may compare the estimated distance with this predefined distance. The predefined distance may be based on an ideal distance between the receiving coil 120 and the transmitting coil 130 for energy to exchange there between. The predefined distance may be a maximum distance between the two coils at which energy may be transmitted. Factors such as the type of battery within the vehicle 115, the size of the coils 120, 130, etc., may attribute to the maximum distance. The controller may maintain this predefined distance in a database, either locally or external to the vehicle 115 (e.g., cloud).

If the controller 150 determines that the vehicle 115 is not at an optimal position, the process proceeds back to block 715 to gather further location data. If the controller 150 determines that the vehicle 115 is at an optimal distance, that is, the vehicle 115 is within a predefined distance of the external power source 105, the process proceeds to block 725. Thus, until an optimal distance is achieved, the vehicle display device 110 is iteratively updated in real time or near real time, to indicate the vehicle's position via the interface 125.

In block 735, the vehicle controller 150 may instruct the display device 110 to display an optimal distance indicator 225. Examples of the optimal distance indicator 225 are shown in FIGS. 6A-6B. The process may then end.

Figure 8:
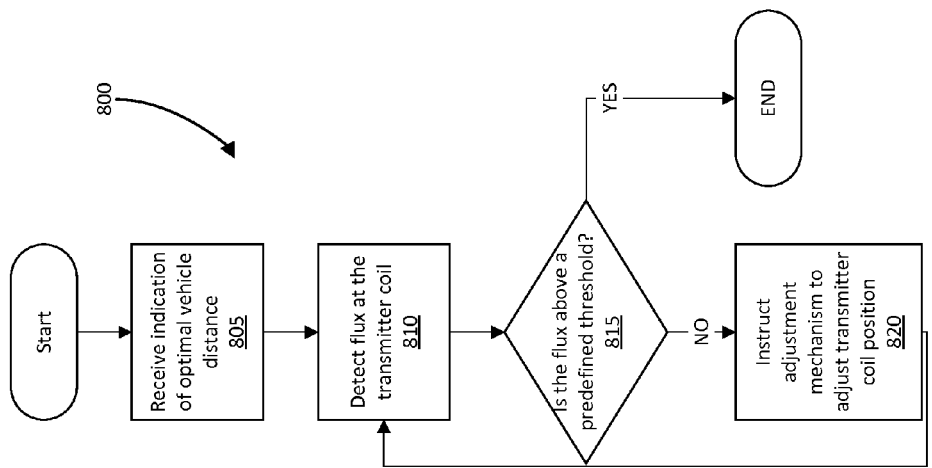
FIG. 8 is another exemplary flow chart for the wireless power transfer system.

FIG. 8 is an exemplary flow chart for the guidance system. Specifically, FIG. 8 is an exemplary process for aligning the transmitting coil 130 within the secondary coil once an optimal distance between the two coils 120, 130 has been achieved.

In block 805, the coil controller 195 may receive an indication that the optimal distance between the receiving and transmitting coils 120, 130 has been achieved. This indication may come from the vehicle 115 via the coil to coil frequency communication system. A confirmation message may be transmitted via this communication system. The vehicle controller 150 may transmit the confirmation message to the coil controller 195.

In block 810, once the confirmation message is received, the coil controller 195 may then detect a flux at the transmitting coil 130.

The flux may relate to distance between the two coils. The distance between the two coils affects the strength of the electromagnetic field created between the coils. The strength of the electromagnetic field affects the efficiency of the energy transfer from the transmitting coil 130 to the receiving coil 120. To determine the flux, the transmitting coil 130 may transmit a small power signal. The controller transceiver may then respond to the power signal. This response signal may indicate the strength of the flux between the two coils 120, 130. The coil controller 195 may know the capability of the transmitting coil 130 and may determine if the field created between the coils 120, 130 is adequate for power transfer.

In block 815, the coil controller 195 may determine whether the detected flux is above a predefined threshold. The predefined threshold may be a flux corresponding to an ideal distance or alignment between the two coils 120, 130 at which energy best transfers (e.g., the capability of the transmitting coil 130 to transmit energy). For example, the predefined threshold may represent an optimal alignment between two coils. This alignment may include both vertical and horizontal alignment (i.e., alignment of the coils in both the y-axis and x-axis.) If the flux is above a predefined threshold, the process may end. Although FIG. 8 shows the process as ending, in operation, once the coils are in alignment, the transmitting coil 130 may transfer energy to the receiving coil 120 via the electromagnetic field created there between. The energy may then be used to charge the vehicle battery. If the flux is not above the predefined threshold, the process may proceed to block 820.

In block 820, the coil controller 195 may instruct the adjustment mechanism to adjust one or both of the horizontal and vertical positions of the transmitting coil 130. In one example, the horizontal adjustment mechanism 180 may be adjusted to the left or right. In another example, the vertical adjustment mechanism 205 may be lowered or raised to reach the most optimal position. The coil controller 195 may cause the coil 130 to be moved to the left or right. It may then receive a flux at the new location of the coil 130. If the flux decreases, the controller 195 may instruct the coil 130 to move back in the direction it just came from (i.e., reverse direction.) If the flux increases, however, the coil 130 may continue in the same direction until the flux ceases to increase.

In another example, the external charge source 105 may include additional ultrasonic sensors used to locate the secondary coil 120. Based on the input from the sensors, the controller 195 may instruct adjustment of the primary coil 130.

The process may proceed to block 810 to adjust the position of the transmitting coil 130 until an optimal vertical and horizontal position is achieved.

Once an optimal vertical and horizontal position of the primary coil 130 is achieved, indication of this achievement may be transmitted to the controller 150 via the radio-frequency communication system between the vehicle 115 and the pedestal 105. Upon confirmation that the optimal position has been achieved, the vehicle may return to the park assist mode. Additionally or alternatively, prior to the vehicle reaching an optimal position, as described with respect to process 700, the park assist system may be used to achieve such a position. That is, once an external charge source 105 has been recognized by the vehicle 115, the park assist system may be used for hands-free parking of the vehicle at the desired distance from the source 105.

Examples of wireless charging systems are described that are configured to provide position guidance to drivers of vehicles via vehicle interfaces. That is, the systems may output instructions to assist drivers in positioning vehicles at an optimal position relative to primary charge coils. A transmitting coil may be mounted in a vertical pedestal configured to align with a receiving coil within a bumper of a vehicle. The pedestal may adjust the position of the transmitting coil in response to detecting the receiving coil. By placing the receiving coil within or at the bumper of the vehicle, the underbody of the vehicle is not affected by the space and location constraints that typically plague wireless charging systems.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

Computing devices, such as the controllers 150, 195, display device 110, etc., generally include computer-executable instructions in which the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, for example, from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, the use of the words "first," "second," etc., may be interchangeable.

What is claimed is:

1. A vehicle comprising:
   a vertically mounted secondary charge coil;
   a display; and
   a park assist system including a transceiver and at least one controller programmed to
      during a parking mode, detect objects within a vicinity of the vehicle by a plurality of ultrasonic sensors, output instructions via the display to assist a driver of the vehicle in avoiding contact with the detected objects, and cause the secondary charge coil to periodically generate a field to excite a remote primary charge coil, and
      during a charging mode initiated based on a response to the field at the primary charge coil output instructions via the display to assist the driver in positioning the vehicle based on the plurality of ultrasonic sensors to place the vertically mounted secondary charge coil in a target position relative to the primary charge coil for charging a vehicle and
      generate instructions to display an alert indicating whether the vehicle is in the parking mode or the charging mode.

2. The vehicle of claim 1, wherein the instructions, during the charging mode, include data indicative of a representation of a position of the vehicle relative to the primary charge coil.

3. The vehicle of claim 2, wherein the at least one controller is further programmed to output an alert, during the charging mode, indicating that the secondary charge coil has achieved a target position relative to the primary charge coil.

4. The vehicle of claim 1, wherein the processor is further programmed to cease to output instructions in avoiding contact with objects during the charging mode.

5. A park assist system comprising:
   ultrasonic sensors configured to detect objects in a vicinity of a vehicle;
   a controller programmed to: transition, in response to a trigger signal, from a parking mode providing instructions to assist a driver in avoiding contact with the detected objects to a charging mode providing instructions to assist the driver in positioning a secondary coil relative to a primary coil as detected by the sensors.

6. The system of claim 5, wherein the at least one controller is further programmed to, during the parking mode, cause the secondary coil to periodically generate a field to excite the primary coil.

7. The system of claim 5, wherein during the transition an alert indicates whether the vehicle is in the parking mode or the charging mode.

8. The system of claim 5, wherein the trigger signal indicates that the primary charge coil is located within the vicinity of the vehicle.

9. A method for advising a driver of a vehicle comprising:
   by a processor,
      during a parking mode, outputting instructions to assist the driver in avoiding contact with objects within a vicinity of the vehicle and causing charge coil excitation signals to be broadcast from the vehicle;
      transitioning from the parking mode to a wireless charging mode in response to receiving a reply to the charge coil excitation signals;
      generating an alert indicating the transition; and
      during the wireless charging mode initiated based on a response to the excitation signals at a primary charge coil, outputting instructions to a display to assist the driver in positioning a vertical charge coil of the vehicle relative to the primary charge coil for charging the vehicle.

10. The method of claim 9 further comprising outputting an alert, during the wireless charging mode, indicating that vehicle has achieved a target position relative to the charge source.

11. The method of claim 9, wherein the instructions, during the wireless charging mode, include data indicative of a representation of a position of the vehicle relative to the charge source.

12. The method of claim 11 wherein the alert indicates whether the vehicle is in the parking mode or the wireless charging mode.

* * * * *